United States Patent Office 2,757,125
Patented July 31, 1956

2,757,125

N-HIGHER ALKYL-4-CARBOXY-2-PYRROLIDONES AND COMPOSITIONS THEREWITH

Anton Mudrak, Hillside, N. J., assignor to Colgate-Palmolive Company, Jersey City, N. J., a corporation of Delaware No Drawing. Application May 16, 1952,
Serial No. 288,319

16 Claims. (Cl. 167—93)

The present invention relates to novel pyrrolidone compounds and to compositions containing the same.

Various compounds having a pyrrolidone structure are known in the art. The reaction of itaconic acid with amines to form carboxypyrrolidones is known, as described in Ann., 77, 284 (1851); Am. Chem. J. 9, 199 (1887); Ann., 254, 149 (1889); J. A. C. S. 72, 1415 (1950). The latter citation describes the preparation of a number of such compounds, primarily from aromatic amines. The production of the 3,5,5-trimethylhexyl derivative is also described therein. Many important variations in properties may be effected by varying the nature or type and arrangement of substituent groups upon such a heterocyclic nucleus.

The novel compounds of the present invention are selected from the group consisting of 1-higher alkyl 4-carboxy 2-pyrrolidone compounds and its derivatives, including salts, acid halides, amides, and esters thereof, said alkyl group having at least 10 carbon atoms. An embodiment relates to compounds represented by the formula:

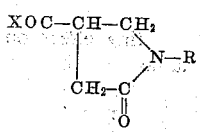

wherein R is an essentially straight-chain higher alkyl group, preferably 12 to 14 carbons, and X is selected from the group consisting of —OH, —OY wherein Y is a salt-forming cation, and —OR', —NH$_2$, —NHR', and —NR'$_2$ wherein R' is an aliphatic radical.

Included within the ambit of the invention are the following classes of compounds which may be represented as follows:

(1) 1 or N-higher alkyl 4-carboxy 2-pyrrolidone wherein the alkyl group is a long-chain radical of at least 10 carbons, and preferably 12 to 14 carbons, suitable examples being where the alkyl group is n-dodecyl, tetradecyl, hexadecyl and octadecyl groups.

These compounds may be prepared in any suitable manner. A suitable mode of synthesis comprises heating itaconic acid with a long-chain alkyl primary amine for sufficient time to form the heterocyclic N-alkyl 4-carboxy 2-pyrrolidone compound as a condensation product with the elimination of water. The resulting product may thereafter be purified if desired in any suitable manner, such as by recrystallization from a solvent. The reaction is facilitated and the product is recovered in high yield and purity if the reaction is conducted in the presence of an organic solvent in which the condensation product is sparingly soluble or insoluble, suitable solvents being benzene, ether, ethylene dichloride, nitroethane, etc., with optimum effects resulting with the use of a nitrile solvent such as RCN where R is lower alkyl, e. g. acetonitrile.

(2) Water-soluble salts of the above N-higher alkyl 4-carboxy 2-pyrrolidone compounds. These compounds may be prepared by reacting the carboxy compounds with sufficient amount of an alkaline compound, preferably in an aqueous medium, to form the corresponding carboxylic salts which may be purified if desired in any suitable manner. Suitable bases or alkaline compounds which may be used to form the salts are alkali metal bases (e. g. sodium hydroxide, potassium hydroxide and lithium hydroxide), ammonium hydroxide, ethanolamine (e. g. mono-, di- and tri-ethanolamine), etc. Further specific examples of these derivatives are sodium salt of N-lauryl 4-carboxy 2-pyrrolidone, potassium salt of N-myristyl 4-carboxy 2-pyrrolidone lithium salt of N-lauryl 4-carboxy 2-pyrrolidone, monoethanolamine salt of N-lauryl 4-carboxy 2-pyrrolidone, sodium salt of N-palmityl 4-carboxy 2-pyrrolidone.

Other novel salts may be formed in any suitable manner including the alkaline earth metal salts such as calcium and magnesium salts, heavy metal salts such as copper and zinc, etc., by reaction of the appropriate base e. g. calcium and magnesium hydroxide, to effect salt formation. These salts are essentially insoluble in water however.

(3) N-higher alkyl 4-amido 2-pyrrolidones. These compounds may be prepared by the condensation of ammonia or ammonium hydroxide and the N-alkyl 4-carboxy 2-pyrrolidone compounds with the elimination of water to produce the corresponding amide from the original 4-carboxyl group. Alternatively, the acid chloride or methyl ester of said 4-carboxy compound may be used as a reactant to form the corresponding amide. Suitable compounds which may be prepared are the N-lauryl 4-amido, N-myristyl 4-amido, N-palmityl 4-amido, N-decyl 4-amido and N-octadecyl 4-amido derivatives of 2-pyrrolidone.

The alkyl substituted amido compounds may be prepared similarly by using suitable amines as a reactant such as the lower alkyl primary amines e. g. methyl amine which would result in N-higher alkyl-4-methyl-amido 2-pyrrolidone.

(4) N-higher alkyl-4-alkylolamido 2-pyrrolidone prepared as above by condensation of the appropriate bases with the corresponding 4-carboxy 2-pyrrolidone compounds or suitable reactive derivatives. Suitable bases are the lower alkylolamines having a reactive hydrogen attached to the nitrogen atom, such as the primary or secondary alkylolamines having up to about six, and preferably 2 to 4 carbon atoms in each alkylol group. The alkylol groups may be mono- or polyhydroxy alkyl. It is preferred to use the primary alkylolamines such as monoethanolamine, isopropanolamine, monopropanolamine, monobutanolamine, 2-amino 2-methyl propanol, 2,3 dihydroxypropylamine (glycerylamine), etc. Suitable secondary amines are diethanolamine, diisopropanolamine, etc. Further examples of specific products are N-lauryl-4-ethanolamido, N-myristyl-4-propanolamido, N-lauryl-4-glycerylamido, etc., derivatives of 2-pyrrolidone.

(5) Aliphatic esters of N-higher alkyl-4-carboxy 2-pyrrolidones which may be prepared by reaction of an aliphatic alcohol with the carboxy compound with elimination of water to form the corresponding esters. Any suitable alcohol having a reactive hydroxyl group may be employed, including mono- and poly-hydroxyl compounds. It is preferred to use the lower aliphatic saturated alcohols of up to about six carbons, though other alcohols may be used also. Examples of alcohols suitable for ester formation are methyl alcohol, glycerine, ethyl alcohol, ethylene glycol, propyl alcohol, allyl alcohol, etc. Representative specific compounds formed thereby are N-lauryl-4-carboxymethyl, N-myristyl-4-carboxyethyl, N-lauryl-4-carboxymonoglyceryl, etc., derivatives of 2-pyrrolidone.

The following examples are illustrative of the preparation of these compositions and it will be understood that the invention is not limited thereto. All parts are by weight unless otherwise specified.

EXAMPLE I 32 parts of itaconic acid and 46 parts of lauryl (n-dodecyl) amine are heated and refluxed for about 4 hours, with the vaporization of the water formed during the reaction. The resulting product crystallizes on cooling to room temperature, and is recrystallized from acetonitrile. The crystalline condensation product is 1-lauryl-4-carboxy 2-pyrrolidone, M. P. 74–76° C. The reaction is facilitated if the acetonitrile is present initially as a solvent medium.

51.5 parts of the above compound are suspended in 500 parts of water and 150 parts of methanol and the pH adjusted to 7.1 with dilute sodium hydroxide to give a solution of the corresponding sodium salt which is roll-dried to a fine white powder. The sodium N-lauryl-4-carboxy 2-pyrrolidone shows good foaming properties in aqueous solution. It is reacted with calcium chloride to form the corresponding calcium salt which is water-insoluble.

EXAMPLE II 65 parts of itaconic acid and 120 parts of n-hexadecylamine are heated at 180–190° C. for four hours with the removal of water. The resulting molten mass is poured into water to dissolve any unreacted itaconic acid, and the mixture acidified with about 30 parts of concentrated hydrochloric acid to produce a solid product which is filtered and recrystallized several times from warm acetonitrile. The desired product is a white solid material having the formula of 1-hexadecyl-4-carboxy 2-pyrrolidone.

This product is suspended in water-ethanol and neutralized to a pH of 7.2 with dilute caustic soda. The solution is roll-dried, resulting in a hard solid at room temperature, the product being the sodium salt of 1-hexadecyl-4-carboxy 2-pyrrolidone.

EXAMPLE III 0.5 mole each of itaconic acid and n-tetradecyl amine are heated at about 200° C. for 3 hours with the removal of water, the resulting mixture being poured into water and filtered. The product is dissolved in acetonitrile, decolorized, filtered and recrystallized several times from the same solvent resulting in 1-tetradecyl-4-carboxy 2-pyrrolidone, M. P. 75.5–76.5° C.

EXAMPLE IV 65 parts of itaconic acid and 89 parts of n-decylamine are heated about one hour until 9 parts of water are collected in a moisture trap. The reaction mixture is poured into water, cooled, filtered and recrystallized from acetonitrile several times, resulting in white crystals of 1-decyl-4-carboxy 2-pyrrolidone, M. P. 63–65° C.

The sodium salt of this condensation product is formed similarly as in the above examples.

EXAMPLE V 65 parts of itaconic acid and 135 parts of stearylamine or n-octadecylamine are heated until 9 parts of water are collected and heating is continued for two additional hours. The product is poured into water and a brown crystalline mass separated therefrom by filtration. About 400 parts of warm acetonitrile are added to the reaction mixture, and a large portion of the product forms a lower oily layer. The upper layer is decanted and the product is recrystallized from acetonitrile several times. After purification, the product is 1-octadecyl-4-carboxy 2-pyrrolidone having a M. P. of 55–57° C. The corresponding salts may be formed as above described.

EXAMPLE VI 150 parts of 1-lauryl 4-carboxy 2-pyrrolidone is mixed with 750 parts of methanol and 9 parts of sulfuric acid and the mixture is refluxed for six hours. Sodium acetate (9 g.) is dissolved in the reaction mixture and the excess methanol is removed under reduced pressure. The residue is diluted with 750 parts of water and extracted with ether, the ether extract being washed and dried to recover the methyl ester of 1-lauryl-4-carboxy 2-pyrrolidone.

EXAMPLE VII 100 parts of 1-lauryl 4-carboxy 2-pyrrolidone is treated with 48 parts thionyl chloride to produce the corresponding acid chloride. This acid chloride is mixed with concentrated ammonium hydroxide, diluted with water and filtered. The resulting product is dissolved in warm aqueous ethanol, decolorized with carbon, filtered, recrystallized and dried to recover the 1-lauryl-4-amido 2-pyrrolidone, M. P. 120–122° C. This product may also be formed by reacting the methyl ester derivative of Example VI with ammonia in methanol in a sealed tube.

EXAMPLE VIII 62.2 parts (2 mole) of the methyl ester of Example VI are reacted with a 10% excess of monoethanolamine at a temperature of 150–160° C. with the vaporization of the methanol released during the reaction. The reaction product is dissolved in warm acetonitrile, decolorized, crystallized and dried to a fine white powder. The desired product is N-lauryl-4-ethanolamide 2-pyrrolidone having a M. P. of 71–74° C.

These novel compounds have many unusual beneficial properties and therefore have utility in many fields of application, such as anti-bacterial compositions, cosmetic preparations, detergent compositions, etc., with varying effects depending upon the specific compound.

Among the unusual properties proposed by these novel compounds is their anti-bacterial power on micro-organisms normally present in the mouth, such as Lactobaccili. These compounds, particularly the 4-carboxy 2-pyrrolidone type compounds and their water-soluble salts, exhibit an inhibiting effect on the production of acid from fermentable carbohydrates by these micro-organisms found in saliva for example. This inhibiting effect may be determined by a dilution test using a Snyder medium. The Snyder test is well known in the art and is based on the rate of change of the color of an indicator, Brom-cresol-green, in a dextrose agar culture medium adjusted to a pH of 4.8–5.0 when it is inoculated with saliva. Ordinarily, a test tube of such Snyder medium which has been treated with saliva containing a mixture of micro-organisms normally found in the mouth will turn from a green to a yellow color within 24 hours indicating acid production by the action of the micro-organisms or their enzymes upon the carbohydrates. Such color change generally occurs over the pH range of about 4.4 to 4.1. Each active ingredient or compound to be tested may be added in varying amounts to such media which have been inoculated with saliva. The minimum amount of each active ingredient which is necessary to maintain a predominantly green color for 72 hours incubation at 37° C., and therefore inhibit acid production, is called herein the "dilution minimum." This "dilution minimum" is measured or calculated in milligrams per 100 cc. of saliva and represents the relative effectiveness of the active ingredients in the inhibition of the acid production which normally results from the action of said saliva on the nutrient carbohydrate medium. More specifically, these tests may be conducted by heating 10 cc. of sterile dextrose agar, containing the color indicator, in a test tube to liquefy the same, adding to the agar media while at a temperature of about 50–60° C. a quantity of 0.2 cc. of saliva and about 0.1–0.5 cc. of any convenient solution of the active ingredient, and determining thereby the minimum amount of active ingredient which is necessary to maintain the desired color. The minimum number of mg. of active ingredient which is effective per 100 cc. of the saliva may be calculated from the quantities used in the test tubes.

The results on certain pyrrolidone compounds are set forth in the table below, the tested compound in each case being the sodium salt of 1-alkyl-4-carboxy-2-pyrrolidone, the specific alkyl group being described in the table below:

*Table I*

|   | N-Alkyl Group | Dilution Minimum |
|---|---|---|
| a | 3,5,5 trimethylhexyl | 750 |
| b | n-decyl | 75 |
| c | n-dodecyl | 12 |
| d | n-tetradecyl | 25 |
| e | n-hexadecyl | 75 |
| f | n-octadecyl | 750 |

Referring to the data above, it will be evident that the novel compounds of the present invention having a n-higher alkyl group of 10 to 16 carbon atoms are effective antibacterial agents. In contrast thereto, the branch-chained trimethylhexyl and n-octadecyl derivatives show negligible activity as indicated by the extraordinarily high values. Since common cleansing agents such as soap exhibit values in the range of 200–300 mg. in the above test, it will be apparent that the high values for the trimethylhexyl and octadecyl derivatives preclude the practical use of these compounds. No reason is known at the present time for the unusual properties of the $C_{10}$ to $C_{16}$ n-alkyl derivatives, particularly the $C_{12}$ compound in this series.

The $C_{10}$ to $C_{14}$ derivatives also exhibit the unusual properties of being adsorbed and released by proteinaceous material. By reason of such properties, these derivatives may have prolonged activity in such applications where adsorption is possible. This protein adsorption phenomenon is highly specific and may be illustrated as follows. A small amount of casein or essentially equivalent material such as mucin is immersed in a dilute solution of the ingredient to be tested. The protein is thereafter washed, dried and added to the above-described Snyder medium inoculated with saliva. If a predominantly green color persists after 72 hours incubation then a sufficient amount of the active ingredient must have been retained by the protein and subsequently released in the Snyder medium. Under such conditions, the N-higher alkyl derivatives, wherein the alkyl group is 10 to 14 carbons, show marked characteristics for protein adsorption whereas the lower or higher alkyl derivatives do not show adsorption on protein at comparable concentrations.

The novel compounds of the present invention may also have antibacterial or bacteriostatic power against other micro-organisms, particularly those compounds having the N-alkyl chains of 12 to 14 carbon atoms. For example, such compounds as N-lauryl 4-carboxy 2-pyrrolidone or its sodium salt, amide or methyl ester in 0.1% solution inhibit the growth of Staphylococcus aureus bacteria. In comparison, the lower and higher N-alkyl derivatives other than those having 12 to 14 carbons in the alkyl group do not exhibit such bacteriostatic activity under equivalent conditions.

It is an embodiment of the present invention that these novel compounds may be utilized in preparations designed for application in the mouth. There may be prepared suitable tooth powders, tooth pastes, liquid dentifrices, mouth washes or rinses, chewing gum, tablets, lozenges, etc. Any suitable amount of these novel compounds may be incorporated in the oral preparations. The specific amount will vary, naturally, depending upon the specific type of preparation and the specific effects desired, but will generally be a minor amount, such as up to about 50% by weight. In the case of tooth powders and dental creams, these new ingredients will generally be up to about 10% and preferably up to about 5% by weight of the finished formulation.

Any suitable practically water-insoluble polishing agent may be admixed with these novel compounds in the preparation of dentifrice compositions of the present invention. There is a relatively large number of such materials known in the art. Representative materials include, for example, calcium carbonate, dicalcium phosphate (anhydrous or hydrated), tricalcium phosphate, insoluble sodium metaphosphate, aluminum hydroxide, magnesium carbonate, calcium sulfate, bentonite, etc. including suitable mixtures thereof. It is preferred to use the water-soluble calcium and magnesium salts as the polishing agents, and, more particularly, calcium carbonate and/or a calcium phosphate. In general, these polishing agents will comprise a major proportion by weight of the solid ingredients. The polishing agent content is variable, but will generally be up to about 95% by weight of the total composition. In the case of a dental cream such polishing agents will generally be about 20–75% whereas in tooth powders, the polishing agents will usually be a major proportion, such as about 70–95%.

In the preparation of tooth powders, it is usually sufficient to mechanically admix the various solid ingredients. In dental cream formulations, the liquids and solids should necessarily be proportioned to form a creamy mass of desired consistency which is extrudible from a collapsible aluminum or lead tube. In general, the liquids in the dental cream will comprise chiefly water, glycerine, sorbitol, propylene glycol, etc., including suitable mixtures thereof. It is usually advantageous to use a mixture of both water and a humectant or binder such as glycerine, sorbitol, etc. The total liquid content will generally be about 20–75% by weight of the formulation.

If desired, there may also be included in such preparations a water-soluble detergent compound to yield added foaming power and other surface-active properties, such surface active agents being usually characterized by having a long aliphatic chain in the molecule and a water-solubilizing group. It is preferred to use an anionic organic detergent in admixture. Such detersive agents are known and include, for example, the water-soluble salts of higher fatty acid monoglyceride monosulfate detergent (e. g. sodium salt of monosulfated monoglycerides of higher fatty acids of coconut oil), higher alkyl sulfate detergent (e. g. sodium lauryl sulfate), alkyl aryl sulfonate detergent (e. g. sodium dodecyl benzene sulfonate), higher alkyl sulfoacetate (e. g. sodium lauryl sulfoacetate), the conventional soaps of animal or vegetable fatty materials which are water-soluble salts of higher fatty acids (e. g. sodium soaps of coconut fatty acids), etc. In general, these detersive agents may be used in any suitable amount, such as up to about 10% by weight. In the case of non-soap or synthetic detergents they will usually be employed in an amount up to about 5% by weight.

Other adjuvant materials may be similarly incorporated in suitable amounts, particularly in dental creams. It is preferred to use a gelling agent such as the natural and synthetic gums and gum-like materials, e. g. Irish moss, gum tragacanth, sodium carboxymethylcellulose, starch, etc., usually in an amount up to 10% by weight of the dental cream, and preferably from 0.5–5%. Furthermore, such materials as soluble saccharin, flavoring oils (e. g. oils of spearmint, peppermint), coloring or whitening agents, preservatives, alcohol, etc. may be used as desired in proper amount.

Mouth washes or rinses are also within the scope of the present invention. Such products are usually an effective amount of the active ingredient dissolved or dispersed in a suitably flavored liquid vehicle, preferably aqueous alcoholic vehicle. Any suitable amount, such as up to five percent active ingredient may be used. The alcohol concentration may vary depending on the mouth effect desired, such as about 5–70% alcohol, and preferably 5–40%. Liquid dentifrices are also included, such products usually containing a minor amount of active ingredients, usually dissolved or dispersed in an aqueous alcoholic vehicle, preferably containing a mucilaginous material and optionally combined with small amounts of polishing agent, alcohol, glycerine, coloring and flavoring materials.

In addition these pyrrolidone compounds having an N-alkyl chain of at least 10 carbons also exhibit marked surface-active properties rendering them further useful in many other specific types of products also. The long-chain alkyl group is primarily hydrophobic in character, whereas the 4-carboxyl group or derivative thereof is a more hydrophillic group. It is possible therefore to select the specific length of alkyl chain, e. g. 10 to 18 carbons, and hydrophilic group, e. g. carboxylic salt or amide, such that the resulting compound may show affinities toward aqueous and/or fatty or oily matters. Accordingly, it is possible to produce compounds of desired surface activity to fit the requirements for a particular use or class of uses.

Various products in which these novel pyrrolidone compounds may be utilized either for anti-bacterial effect or surface activity are cosmetic and detergent compositions. Such preparations include ointments, lotions, skin creams, jellies, lipsticks, shampoos, shaving creams, detergent bars or cakes, textile-treating, cleansing and laundering compositions, etc.

As indicated, these novel compounds may be used in detergent compositions designed for general washing, cleansing and the like. They may be used in combination with other surface-active materials such as the anionic soap, sulfated or sulfonated organic detersive compounds, in view of the fact that they are, in general, fairly compatible therewith. The water-soluble salts of these N-higher alkyl 4-carboxy 2-pyrrolidones exhibit foaming power and detersive activity in aqueous solution. The above-described amido, alkylolamido and ester derivatives have particular utility as organic builders in admixture with anionic organic detergents, such as soap or the sulphonated (including sulphated) detergents.

It is another embodiment of the present invention that these novel pyrrolidone compounds may be incorporated in minor proportions in detergent compositions consisting essentially of anionic organic detergents to achieve desired modifications in surface-active properties such as foaming power or detergency.

The water-soluble anionic organic detergents previously described are particularly suitable for admixture. Any water-soluble soaps, such as those derived from the fatty acids of tallow, coconut oil, palm oil, etc., may be used with the pyrrolidone compounds. Various aliphatic sulfated or sulfonated detergents, as indicated, may also be used. Among the aliphatic detersive compounds, it is preferred to use the sulfated aliphatic compounds having about 12 to about 22 carbon atoms. Further examples of aliphatic detergents are the sulfuric acid esters of polyhydric alcohols incompletely esterified with higher fatty acids, e. g. monosulfated glyceryl ester of tallow fatty acids; the long chain pure or mixed higher alkyl sulfates, e. g. cetyl sulfate, higher fatty alcohol sulfates derived from fatty alcohols formed by reduction of coconut fatty acids; the hydroxy sulfonated higher fatty acid esters, e. g. higher fatty acid esters of 2,3 di-hydroxy propane sulfonic acid; the higher fatty acid esters of low molecular weight alkylol sulfonic acids, e. g. oleic ester of isethionic acid; the higher fatty acid ethanolamide sulfates; the higher fatty acid amides of amino alkyl carboxylic or sulfonic acids, e. g. lauric amide of taurine, and the like.

Alkyl aryl sulfonate detergents may also be admixed with these pyrrolidones. These aromatic sulfonate detergents are known in the art, the aromatic nucleus being derived from benzene, toluene, xylene, phenol, cresols, naphthalene, etc. The alkyl substituent on the armoatic nucleous may vary widely, as long as the desired detergent power of the active ingredient is preserved.

More specific examples of suitable alkyl aromatic sulfonate detergents are the higher alkyl aromatic sulfonates. The higher alkyl substituent may be branched or straight-chain in structure, and comprise decyl, dodecyl, keryl, mixed long-chain alkyls from polymeric lower mono-olefins, etc. Preferred examples of this class are the higher alkyl mononuclear aryl sulfonates wherein the alkyl group is about 8 to about 22, and preferably about 12 to about 18 carbon atoms, such as the higher alkyl benzene sulfonates.

These various anionic detergents are generally used in the form of their water-soluble salts, such as the alkali metal, ammonium, amine, and alkylolamine salts. While the sodium, potassium, ammonium and alkylolamine (e. g. mono-, di-, and triethanolamine) salts are preferred ordinarily, other salts such as the lithium, calcium, and magnesium salts may be used if desired. For general use, it is ordinarily preferred to use the sodium and potassium salts. For certain specialized uses, it may be preferred to select the ammonium and alkylolamine salts in view of their generally greater solubility in aqueous solution.

The amount of these novel carboxy pyrrolidone compounds or derivatives thereof in detergent composition is variable and usually less than the weight of these detergents. A minor amount of the pyrrolidone compounds, such as about 0.1 to 50% of the detergent composition may be used, depending upon the desired specific effects. Generally, the proportion of pyrrolidone additives will be from about 1 to about 50% of the weight of the anionic detergent and will preferably be from about 0.5 to about 15% by weight of the total detergent composition.

These pyrrolidone additives may be incorporated with the anionic detergent in any suitable way. For example, they may be mechanically admixed with the detergent in essentially dry or liquid state. Illustratively, they may be added to an aqueous slurry of the anionic detergent with vigorous stirring to form a smooth, uniform and homogeneous paste, or they may be dissolved in a suitable solvent and added to the slurry of the detergent ingredient, etc. Thereafter, these compositions may be prepared in the form of solutions, pastes or as dry or partially hydrated solid products such as cakes, granules, flakes, beads, etc. For example, the mixture may be subjected to conventional spray-drying, roll drying or drum drying operations to recover a product in particle form, or subjected to conventional milling and plodding techniques to prepare a product in bar or cake form.

It is common to employ various adjuvant materials in such detergent compositions. The detergent compositions may include any of these substances employed by the art in admixture with such detergent compositions generally, provided the use of any such materials does not completely neutralize or remove the effect of the additives in the relationship set forth. These adjuvant builders or additives may be inorganic or organic in structure and may be mixed with the active ingredient in any suitable manner. Such inorganic builders or additives as the various alkali metal phosphates (e. g. sodium and potassium tripolyphosphate, hexametaphosphate, tetrapyrophosphate, trisodiumphosphate) the alkali metal silicates, sulfates, carbonates, etc. may be employed in these compositions. Suitable organic materials such as sodium carboxymethylcellulose may also be employed herein. It is preferred that the detersive compositions in particulate form contain major amounts of alkaline builders, particularly the inorganic water-soluble phosphates. The total amount of phosphate compounds should be a minimum of at least about 10%, and preferably from about 10 to about 80% by the weight of the detergent composition for best results.

The following formulations prepared in the usual manner are additionally illustrative of the nature of the present invention and it will be understood that the invention is not limited thereto:

EXAMPLE IX.—DENTAL CREAM

| | Percent |
|---|---|
| Calcium carbonate | 45.2 |
| Sodium N-lauryl 4-carboxy 2-pyrrolidone | 3.0 |
| Glycerine | 30.5 |
| Water | 16.0 |
| Irish moss | 1.0 |
| Flavor, preservative, etc. | Q. S. |

The water and preservative are added to a warm suspension of the gum in glycerine and the mix is stirred to form a gel-like mass, after which the polishing agent is added with stirring. The mixture is cooled and the pyrrolidone compound and flavor are added with stirring. The finished mix is then milled to produce a smooth homogeneous cream paste which is packaged in collapsible aluminum or lead tubes.

EXAMPLE X.—DENTAL CREAM

| | Percent |
|---|---|
| Calcium carbonate | 25.0 |
| Insoluble sodium metaphosphate | 25.0 |
| Sodium N-lauryl 4-carboxy 2-pyrrolidone | 2.0 |
| Sodium lauryl sulfate | 2.5 |
| Glycerine | 25.0 |
| Water | 18.0 |
| Gum, flavor, etc. | Q. S. |

EXAMPLE XI.—TOOTH POWDER

| | Percent |
|---|---|
| Dicalcium phosphate dihydrate | 70.0 |
| Calcium carbonate | 24.0 |
| Sodium N-lauryl 4-carboxy 2-pyrrolidone | 3.0 |
| Soluble saccharin | 0.2 |
| Flavor | Q. S. |

EXAMPLE XII.—MOUTH WASH

| | Percent |
|---|---|
| Sodium N-lauryl 4-carboxy 2-pyrrolidone | 0.5 |
| Ethyl alcohol | 10.0 |
| Flavor | 0.2 |
| Soluble saccharin | 0.1 |
| Water | Q. S. |

EXAMPLE XIII.—LIQUID DENTIFRICE

| | Percent |
|---|---|
| Sodium N-laury 4-carboxy 2-pyrrolidone | 2.0 |
| Sodium carboxymethylcellulose | 4.0 |
| Ethyl alcohol | 10.0 |
| Flavor | 0.5 |
| Water | Q. S. |

EXAMPLE XIV.—SHAMPOO

| | Percent |
|---|---|
| Sodium salt of sulfated monoglycerides of higher fatty acids derived from coconut oil | 20.0 |
| N-lauryl 4-amido 2-pyrrolidone | 5.0 |
| Aqueous ethanol (1:1) | 75.0 |

EXAMPLE XV.—SOAP BAR

Sodium soap chips (derived from saponification of a 3:1 mixture of tallow and coconut oil) are mixed with 5% by weight of sodium N-lauryl 4-carboxy 2-pyrrolidone until a uniform mixture is obtained. This mixture is milled over a standard toilet soap mill and the moisture content adjusted to 10%. The milled mixture is then plodded in a conventional soap plodder and extruded as a finished bar which is cut and pressed to cake form suitable for individual use.

EXAMPLE XVI.—SHAVING CREAM

| | Percent |
|---|---|
| N-lauryl 4-amido 2-pyrrolidone | 2.0 |
| Coconut oil | 10.0 |
| Stearic acid | 35.0 |
| Caustic soda | 1.5 |
| Caustic potash | 6.8 |
| Glycerine | 18.0 |
| Water | Q. S. |

EXAMPLE XVII.—DETERGENT COMPOSITION

A detergent composition is prepared by mixing 4% N-lauryl 4-amido 2-pyrrolidone with about 35% sodium dodecyl benzene sulfonate, 40% tripolyphosphate and the remainder essentially sodium sulfate. This composition possesses a high degree of detersive and foaming properties in aqueous solution.

EXAMPLE XVIII.—DETERGENT COMPOSITION

The procedure of Example XVII is repeated with the substitution of 4-ethanolamido 2-pyrrolidone compound for the 4-amido derivative used therein. This composition also exhibits high detersive and foaming properties in aqueous solution.

EXAMPLE XIX.—DETERGENT COMPOSITION

| | Percent |
|---|---|
| N-lauryl 4-ethanolamido 2-pyrrolidone | 2.0 |
| Sodium lauryl sulfate | 16.0 |
| Sodium chloride | 1.0 |
| Sodium tripolyphosphate | 40.0 |
| Tetrasodium pyrophosphate | 15.0 |
| Sodium sulfate | Q. S. |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention what is claimed is:

1. A new chemical compound selected from the group consisting of N-alkyl-4-carboxy 2-pyrrolidone and its salts, acid halides, primary amides and aliphatic substituted amides and aliphatic esters, said alkyl group having at least 10 carbon atoms.

2. As a new chemical compound, a water-soluble salt of N-alkyl-4-carboxy 2-pyrrolidone, said alkyl group having at least 10 carbon atoms.

3. As a new chemical compound, a primary amide of N-alkyl-4-carboxy 2-pyrrolidone, said alkyl group having 12 carbon atoms.

4. As a new chemical compound, an alkylolamide of N-alkyl-4-carboxy 2-pyrrolidone, said alkyl group having 12 carbon atoms.

5. As a new chemical compound, an ester of N-alkyl-4-carboxy 2-pyrrolidone and a lower aliphatic alcohol, said alkyl group having 12 carbon atoms.

6. As a new chemical compound, the sodium salt of N-dodecyl-4-carboxy 2-pyrrolidone.

7. As a new chemical compound, the sodium salt of N-tetradecyl-4-carboxy 2-pyrrolidone.

8. A composition comprising a compound selected from the group consisting of N-higher alkyl-4-carboxy 2-pyrrolidone and its salts, primary amides and aliphatic substituted amides and aliphatic esters, said higher alkyl group having at least 10 carbon atoms, and a carrier therefor.

9. An oral preparation comprising a water-soluble salt of N-alkyl-4-carboxy 2-pyrrolidone, said alkyl group having 10 to 16 carbon atoms.

10. An anti-bacterial composition which comprises an alkali metal salt of N-higher alkyl-4-carboxy 2-pyrrolidone, said alkyl group having 10 to 16 carbon atoms, and a carrier therefor.

11. A dentrifice preparation comprising a water-insoluble polishing agent and a water-soluble salt of N-higher alkyl-4-carboxy 2-pyrrolidone compound, said higher alkyl group having 10 to 16 carbon atoms.

12. A dental cream comprising the sodium salt of N-lauryl-4-carboxy 2-pyrrolidone.

13. A detergent composition comprising a mixture of a water-soluble anionic organic detergent and a minor proportion of a compound selected from the group consisting of N-higher alkyl-4-carboxy 2-pyrrolidone and its salts, primary amides and aliphatic substituted amides and aliphatic esters, said higher alkyl group having at least 10 carbon atoms.

14. A composition in accordance with claim 13 wherein said detergent is a water-soluble non-soap anionic synthetic detergent.

15. As a new chemical compound, an alkali metal salt of N-alkyl 4-carboxy 2-pyrrolidone, said alkyl group being a straight chain of 10 to 16 carbon atoms.

16. A dental cream containing the composition of claim 13.

References Cited in the file of this patent

UNITED STATES PATENTS

| | | |
|---|---|---|
| 2,496,163 | Jacobson | Jan. 31, 1950 |
| 2,542,886 | Wach | Feb. 20, 1951 |

OTHER REFERENCES

Paytash et al.: Journal Am. Chem. Soc., vol. 72, pp. 1415–1416 (1950).

Uhle; Journal Chem. Soc., vol. 73, p. 2402 (1951).

Grob et al.: Helv. Chim. Acta., vol. 32, pp. 2010 to 2023 (1949).